July 10, 1956
T. W. KENYON
2,754,505
TACTILE CONTROL INDICATOR
Filed Oct. 21, 1953
2 Sheets-Sheet 1
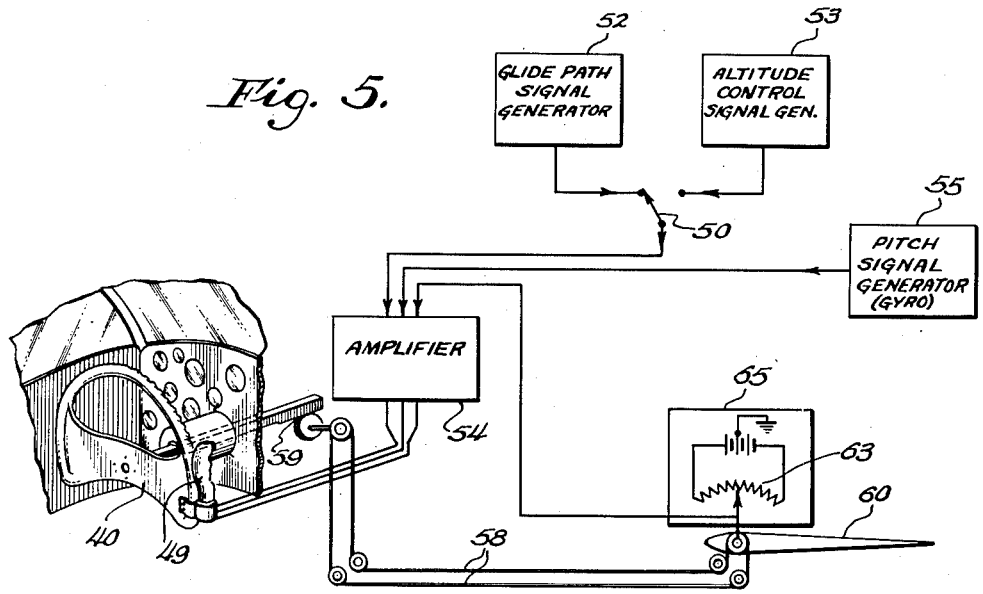
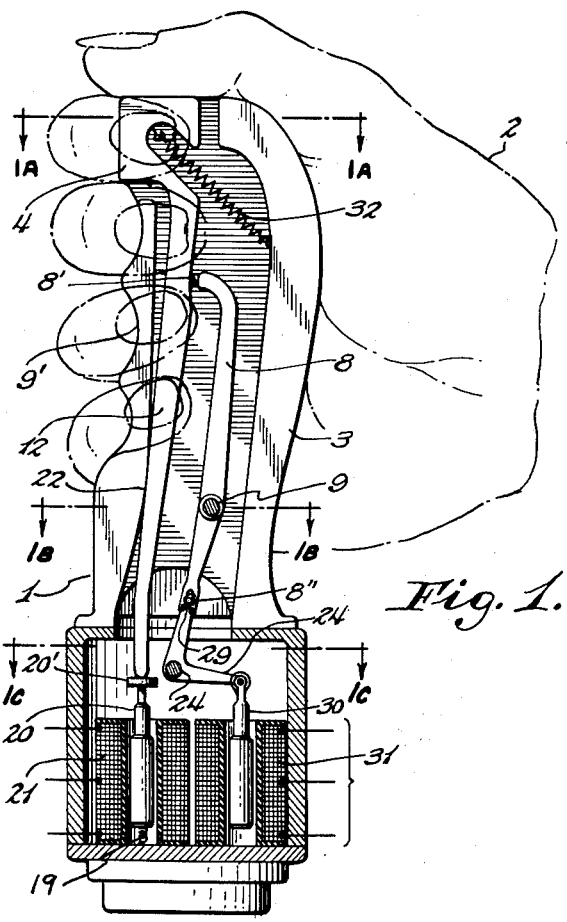
INVENTOR
THEODORE W. KENYON July 10, 1956  T. W. KENYON  2,754,505
TACTILE CONTROL INDICATOR
Filed Oct. 21, 1953  2 Sheets-Sheet 2
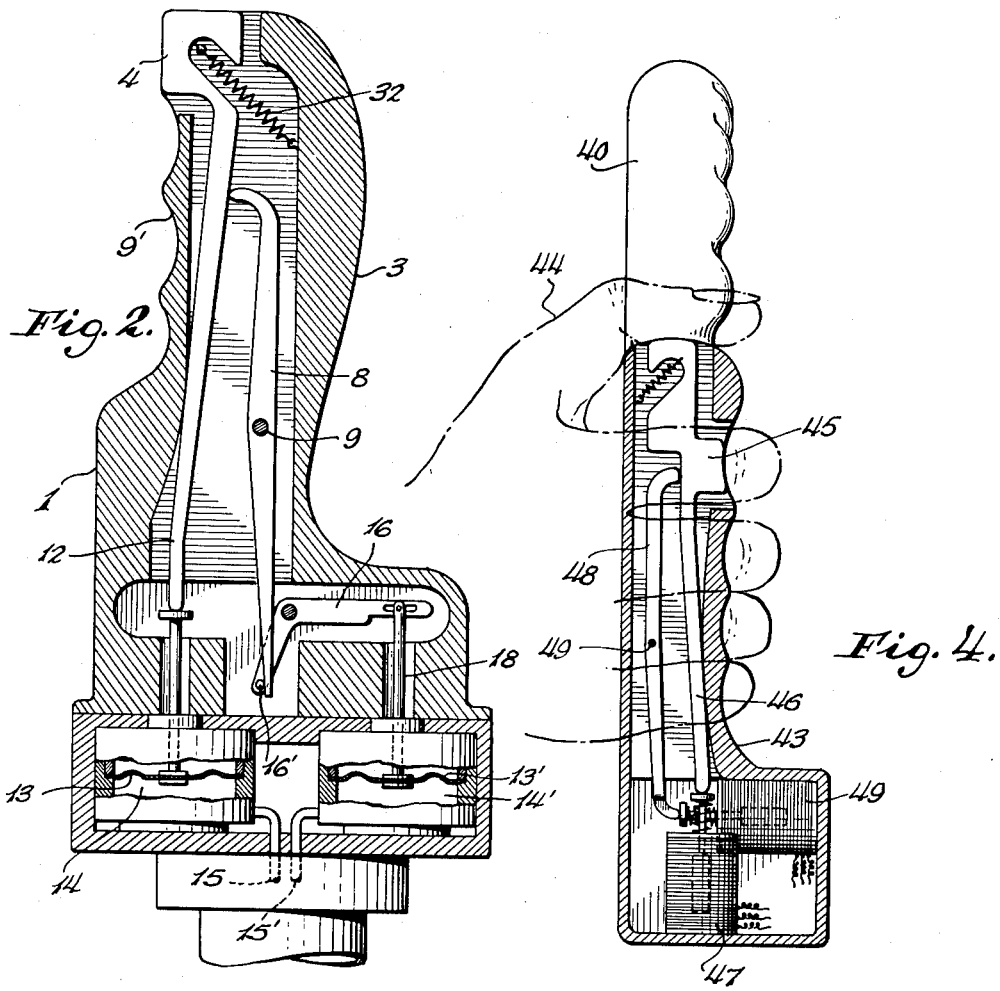
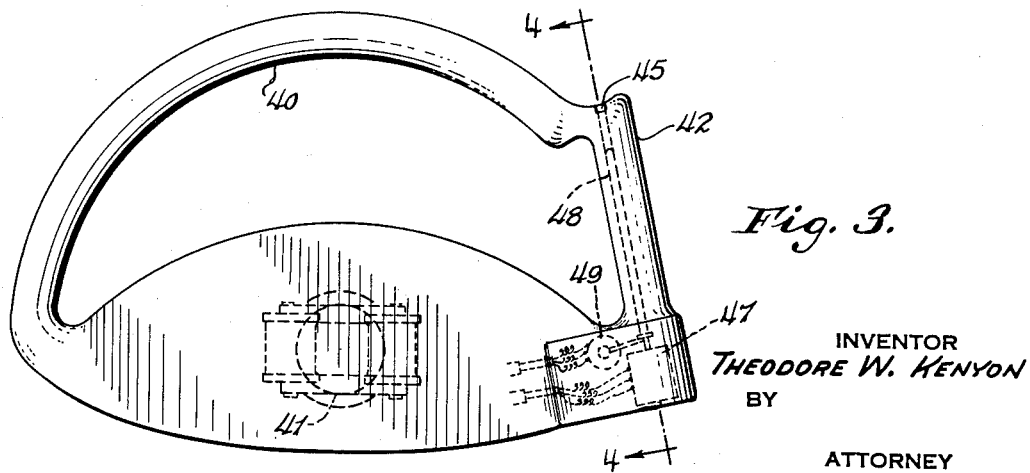
INVENTOR
THEODORE W. KENYON
BY
ATTORNEY

United States Patent Office 2,754,505
Patented July 10, 1956

2,754,505

TACTILE CONTROL INDICATOR

Theodore W. Kenyon, Old Lyme, Conn., assignor to Tactair, Inc., a corporation of Delaware Application October 21, 1953, Serial No. 387,504

6 Claims. (Cl. 340—407)

This invention relates to manual controller apparatus and more particularly to such apparatus having feeler indicator means to indicate in which direction the manual controller should be moved. In aircraft, for instance, instrumentation systems are known wherein a Left-Right meter is energized by compass on radio range information to tell the pilot to move the wheel or controlled joystick to fly left or right. This information may be also supplied audibly as in the familiar A–N radio range signals. All of the above systems tie up at least two of the human operator's senses, namely, sight and touch, or hearing and touch.

The present invention provides a manual controller for a machine or craft wherein the controller has built into it tactile indicator means to provide necessary information. All information is communicated by touch. The control handle of the present invention has a movable projection. It is adapted to move in one direction relative to one surface of control handle and is also adapted to move in a second direction with respect to a second surface. For instance, the projection may move forward and backward and up or down. Control signals are applied to the tactile indicator so that the operator merely moves the handle to follow the direction of the projection until the projection again becomes flush with the controller, thus providing a semi-automatic system of operation.

The present tactile control indicator is particularly advantageous in a situation where a plurality of control device signals are provided and mixed prior to application to the control indicator. In this way the operator or pilot is relieved of all mental activity. He does not have to watch a number of meters giving the various bits of information and then evaluate them into the necessary control movements. With the tactile control indicator of the present invention, the operator merely moves the control in the direction of the tactile indicator in a semi-automatic manner. This leaves his eyes, ears and brain fully free for other duties or emergencies that may arise. A tactile indicator of the present type is particularly advantageous in the landing of air craft since the pilot must receive a number of different pieces of information and instructions from the control tower at that time.

The present invention is also advantageous in connection with training aid devices. For instance, in a trainer, the student can read the proper meters and check his control movement immediately with the correct movement indicated by the tactile indicator.

The present invention is also advantageous for greatly simplifying instrument flying for beginning pilots and pilots who operate planes as a hobby since it gives them all the benefits of instrument flying without the effort required to obtain the instrument rating.

While the present invention is described in connection with aircraft it is not so limited. It may be used on any manual controller for instance on controllers for industrial controls and processes, where two or more variables must be controlled.

Accordingly, a principal object of the invention is to provide new and improved tactile indicator means.

Another object of the invention is to provide a tactile control indicator means cooperating with a manual control handle whereby the operator receives control signals indicating corrective displacements of said controller handle.

These and other objects of the invention will be apparent from the following specification and drawings of which:

Figure 1 is a sectional view of the embodiment of the control indicator of the invention which is electrically energized.

Figures 1A, 1B, and 1C are sections of Figure 1 at lines AA, BB, and CC respectively.

Figure 2 is an embodiment of the corner feeler which is pneumatically energized.

Figure 3 shows an embodiment of the invention mounted on a control wheel.

Figure 4 is a sectional view of Figure 4 taken at the line 5—5.

Figure 5 is a block diagram illustrating the use of the present invention in control system.

Referring to Figure 1, there is shown a control handle 1 which is adapted to be held in the hand 2 of the operator as shown. The handle is provided with finger grips 9 adapted to contact the last three fingers of the hand. The upper forward corner element 4 of the handle is movably mounted so it may move up or down or forward or backward, as will be more fully described. The palm of the operator's hand bears on the rear surface 3 of the handle. The handle is integral except that it is hollow and contains the movable element 4. The corner feeler element 4 is mounted on a shaft 12 which is supported by anvil 20' and actuated by the armature 20 of the solenoid 21. The shaft 12 is supported laterally by the handle 1 as at point 22 and also by the upper point 8' of member 8. Therefore, it is seen that the corner feeler element 4 may move up or down against the thumb of the operator in response to signals on the solenoid 21. Spring 19 biases shaft 12 to zero position.

The forward and back movement of the indicator element 4 is provided by the arm 8 which is pivotally connected to the handle at the point 9. The arm 8 terminates in a fork at its lower end 8'' which is adapted to engage a pin, connected to the bell crank 24 which is pivotally connected to the handle 1 at the point 24'. The other end of the bell crank is pivotally connected to armature 30 of the solenoid 31. The solenoid 21 and 31 have center tapped windings so that they may be driven up or down. Therefore, when the solenoid armature 30 goes up, it will rotate the bell crank 24 counter-clockwise, which in turn, will cause the member 8 to rotate clockwise about point 9 so that the movable corner feeler 4 will be retracted due to the pull of the spring 32.

Note that the corner feeler 4 may move in the two component directions at the same time, for instance, it may move up and forward, or up and backward and so on. The corner feeler control handle is preferably used so that when it is desired to move the handle forward the element 4 will move forward away from the surface of the handle and bear against the index finger. The operator then pushes the handle forward until the corner element 4 again pulls flush with the surface of the handle.

Similarly, the corner element 4 will move up or down against the thumb of the operator, if an up or down movement of the control handle is required.

Figure 1A shows a section taken along the line A—A of Figure 1 near the top of the handle. It shows the movable corner feeler 4 mounted flush with the handle 1. The thumb of the operator will rest on the top of the feeler element 4 as shown in Figure 1.

Figure 1B shows a section taken along the line B—B of Figure 1. It shows a pin 9' which pivotally connects the element 8 to the handle 1. A section of the element 12 is also shown.

Figure 1C is a section of Figure 1 taken along the line C—C. It shows the bell crank 24 connected by means of the pin 25 to the handle 1. This view also shows the solenoids 21 and 31 and their armatures 20 and 30. The fork 8" of member 8 is also connected to the bell crank 24, by the pin 29.

Referring to Figure 2, there is shown a control handle 1 which is adapted to be held in the hand of the operator. The control handle for instance is adapted to control a craft or machine by moving forward or backwards, or up and down, relative to the operator. The palm of the operator's hand fits about the rear surface 3 of the control handle. His thumb and first finger rests on the corner member 4, and his other three fingers wrap around the handle, the last three fingers contacting the finger grips 9. The corner indicator 4 is mounted on a shaft member 12, which is connected to a diaphragm 13 which is mounted in cylinder 14. The diaphragm 13 is adapted to move up and down in response to pneumatic pressure applied via the conduit 15, thereby energizing the tactile member 4 to move up or down, and giving an indication to the operator by moving his thumb up and down.

The forward-back movement of the tactile indicator 4 is provided by a member 8 which is pivotally connected to the handle at 9. The lower end of member 8 bears on pin 16' of a bell crank 16, which in turn bears on a shaft 18 which is connected at its other end to a diaphragm 13'. The diaphragm 13' is adapted to be energized by an input on the conduit 15', as previously described, to cylinder 14'. The pistons move against the pressure of the spring 32.

Figures 3 and 4 show a modification of the tactile indicator connected to an aircraft wheel 40. The aircraft control wheel is adapted to turn about the axis 41 to turn the aircraft and is adapted to be pushed forward and backward to dive or climb the aircraft in conventional manner. The wheel 40 has been modified at its right hand side to incorporate a tactile indicator 42 of the present invention. Figure 4 shows a section of the tactile indicator 42 taken along the line 4—4. Figure 4 shows the handle 43 gripped in the right hand 44 of the operator. The movable element 45 is adapted to move up and down and forward and backward with respect to the surface of the hand grip in substantially the same manner as previously described. The feeler element 45 is moved up and down by means of shaft 46 in response to the operation of the solenoid 47. Similarly, the feeler element 45 is adapted to move forward or backward against the index finger in response to rotation of the elements 48 about the point 49. The element 48 is adapted to be actuated by the solenoid 49.

The operation of the embodiment of Figures 3 and 4 is as follows: When the movable element 45 moves up, it will indicate a turn to the left and when it moves down it will indicate a turn to the right. When the element 45 moves forward in response to the solenoid 49, it indicates that the wheel should be pushed forward and when the element 45 is retracted, it indicates that the wheel 40 should be pulled backward. In all cases, the wheel is moved until the control element becomes flush in both component directions with the handle.

Figure 5 illustrates the tactile control indicator from the present invention used in a complete system. The system shown is an altitude control system for an aircraft. The various altitude control signal sources providing signals are mixed in an amplifier 54 and applied to the solenoid of the tactile indicator 49 to indicate to the pilot whether he should move up or down, i. e. pull the wheel 40 back or forward. A glide path signal generator 52 which may be a radio receiver, or alternatively, an altitude control signal generator 53, for instance a barometer may be connected via switch 50 to the amplifier 54. The next signal is a craft altitude pitch signal from pitch signal generator 55 which may be a gyroscope. The output of the pitch signal generator is also applied to the amplifier 54. The third signal provided for control is a signal proportional to the present position of the control surface 60 for instance an aileron.

The control wheel 40 is moved forward and back and is connected to move the aileron 60 by means of the linkage comprising rack and pinion 59 and cable system 58. The position of the control surface 60 of the craft may be transmitted by a signal generated by potentiometer 63 which is also connected to the amplifier 54. The apparatus for supplying the signal proportional to the position of the control surface may be called a control element position signal generator 65.

In operation, the various signals are mixed in amplifier 54 in the same manner as conventionally done in a servo amplifier of an automatic pilot. However, instead of the output of the amplifier driving a servo motor to directly control the rudder or aileron as the case may be, the amplifier 54, energizes the tactile indicator of the present invention, thereby utilizing the pilot as the connecting link in the chain of control.

Figure 5 only shows altitude information applied to the tactile indicator 9. Azimuth information may be applied to the other solenoid of the tactile indicator 1 in similar manner.

I claim:

1. Control apparatus comprising a manual control handle having two directions of control said handle being adapted to fit the hand of an operator with the thumb resting on the terminal end of said handle, a corner feeler element fitting in the corner of said handle said corner feeler element contacting the thumb and index finger of the operator, means for moving said feeler element longitudinally with respect to said handle in response to a first signal, and means for moving said corner feeler element laterally with respect to said handle in response to a second signal.

2. Tactile control indicator means comprising a manual controller having a squared butt end and a longitudinal axis portion, a corner feeler member adjustably positioned within the squared butt end portion of said controller and being so shaped as to conform to the surface thereof, means to move said corner feeler member along the longitudinal axis of said controller in response to a first input signal, the magnitude of said displacement being proportional to the magnitude of said first input signal and means to move said corner feeler member at right angles to the longitudinal axis of said controller in response to a second input feeler, the magnitude of said displacement being proportional to the magnitude of said second input signal.

3. Apparatus as in claim 2 wherein said corner feeler member contacts the thumb of an operator and moves said thumb along the longitudinal axis of said controller, and said corner feeler member contacts the index finger of the operator and moves said index finger at right angles to the longitudinal axis of said controller.

4. A control handle having a longitudinal axis, a corner feeler element connected flush with the terminal end of said control handle, means to actuate said corner feeler along the longitudinal axis of said handle, and means to actuate said corner feeler at right angles to said longitudinal axis.

5. Tactile control means comprising a manual controller having two degrees of freedom and a grip portion shaped to receive a hand of the operator, a first movable element movably positioned within said controller in the area where the thumb of said operator contacts said controller, a second movable element movably positioned within said controller in the area where the index finger of said operator contacts said controller, means to move said first movable element with respect to the operator's thumb in response to a first control signal and means to move said second movable element with respect to the index finger of said operator's in response to a second control signal.

6. Apparatus as in claim 5 wherein the displacement of said first movable element is proportional to the magnitude of said first control signal and the displacement of said second movable element is proportional to the magnitude of said second control signal.

References Cited in the file of this patent

UNITED STATES PATENTS

| | | |
|---|---|---|
| 1,416,804 | Evans | May 23, 1922 |
| 2,148,471 | Jones | Feb. 28, 1939 |
| 2,657,476 | Holcombe | Nov. 3, 1953 |